June 19, 1951 A. J. GRANBERG 2,557,378
BALANCED SLOW-CLOSING VALVE ASSEMBLY
Filed Oct. 25, 1948 3 Sheets-Sheet 1

INVENTOR.
ALBERT J. GRANBERG
BY
Bruce & Brosler
HIS ATTORNEYS

June 19, 1951 A. J. GRANBERG 2,557,378
BALANCED SLOW-CLOSING VALVE ASSEMBLY
Filed Oct. 25, 1948 3 Sheets-Sheet 2

INVENTOR.
ALBERT J. GRANBERG
BY
Bruce & Brosler
HIS ATTORNEYS

INVENTOR.
ALBERT J. GRANBERG
BY
Bruce & Brosler
HIS ATTORNEYS

Patented June 19, 1951

2,557,378

UNITED STATES PATENT OFFICE 2,557,378

BALANCED SLOW-CLOSING VALVE ASSEMBLY

Albert J. Granberg, Oakland, Calif.

Application October 25, 1948, Serial No. 56,407

4 Claims. (Cl. 277—43)

My invention relates to pump systems of the type embodying a delivery hose and meter, and more particularly to valve means adaptable for use in such a system.

Pump systems embodying a delivery hose and meter are customarily employed in delivering fluid such as gasoline from tank trucks to underground tanks. Such systems quite often employ a counting mechanism associated with the meter, to enable an operator to determine the quantity of fluid being delivered to a customer. The discharge of such fluid from the system is under the control of an operator, by means of a valve installed in the line, usually on the output side from the meter. In connection with the operation of a system of this type, it is important that the operator deliver the proper quantity of liquid and no more, or in other words, that the meter shall indicate the proper amount when the valve is shut off. It is rather difficult for an operator to accurately gauge this in view of the fact that the counter wheels of the counting mechanism are rotating quite rapidly as the full flow of liquid passes through the meter, with the result that the valve is shut off too suddenly, and this in turn produces a transient pressure wave in sections of the system which jars the pipe lines and sometimes causes injury to the lines as well as to the fittings.

Among the objects of my invention are:

(1) To provide a novel and improved valve assembly having a normal slow-closing action in the absence of manual restraint thereon;

(2) To provide a novel and improved value assembly of the slow-closing type in which the closing time may be regulated;

(3) To provide a novel and improved valve assembly capable of being readily opened against heavy line pressures;

(4) To provide a novel and improved self-balancing valve assembly;

(5) To provide a novel and improved slow-closing valve assembly which may be opened readily against heavy line pressures;

(6) To provide a novel and improved valve assembly of the piston type which may be held in balance with a minimum of effort at any point within the limits of its operation;

(7) To provide a novel and improved slow-closing valve assembly which lends itself to economical manufacture;

(8) To provide a novel and improved valve assembly capable of use with a minimum of effort in regulating the flow of fluid under pressure therethrough.

Additional objects of my invention will be brought out in the following description of preferred embodiments of the same taken in conjunction with the accompanying drawings wherein—

Figure 1:
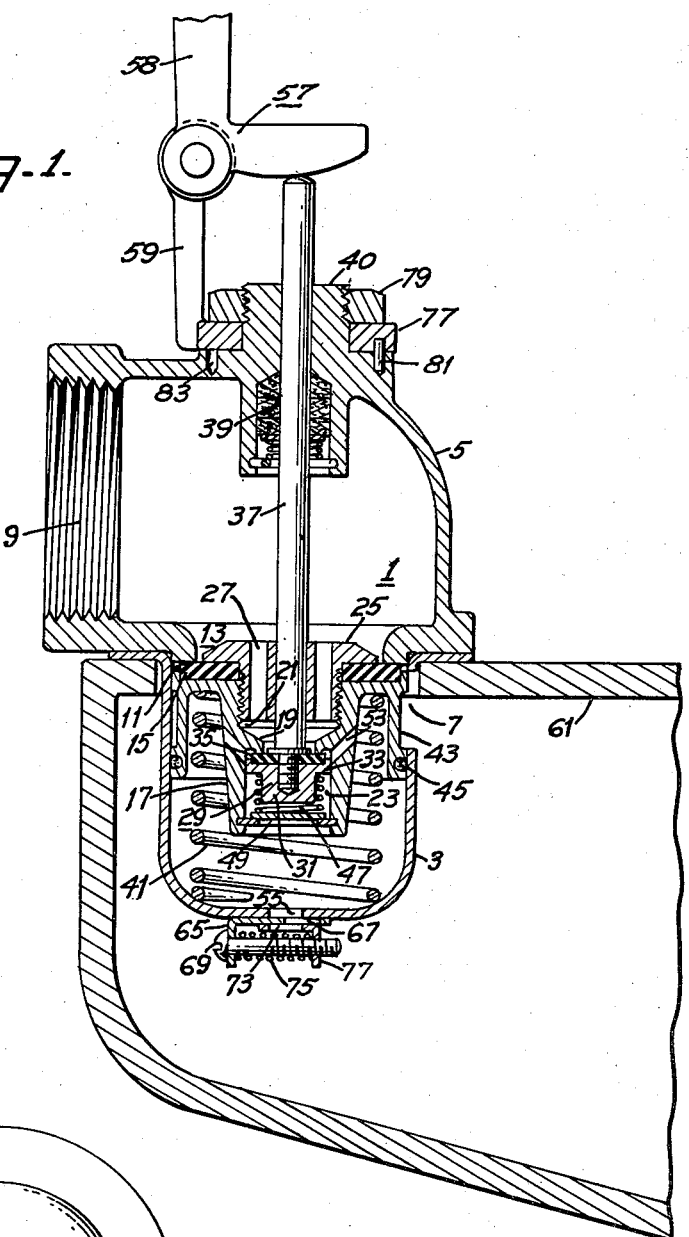
Figure 1 is a view in section through a valve assembly incorporating the features of the present invention.
Figure 2:
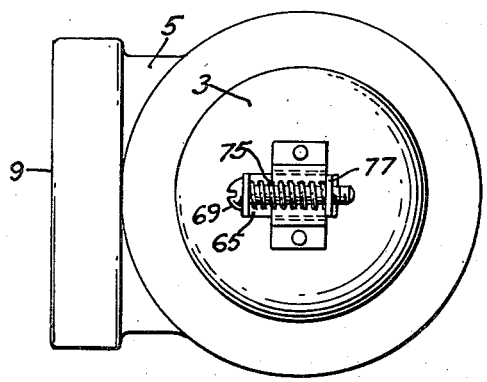
Figure 2 is a bottom end view of such valve assembly.
Figure 3:
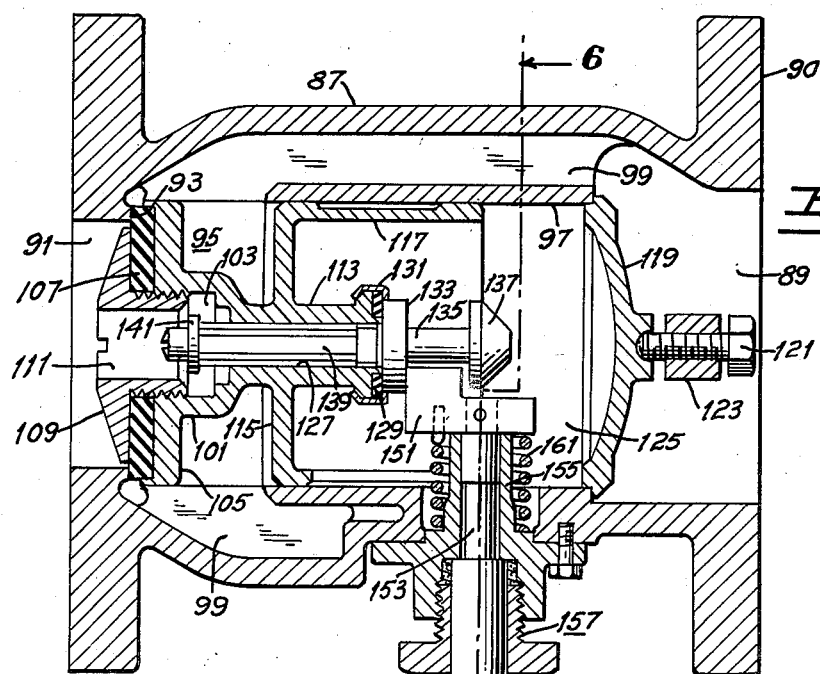
Figure 3 is a view in section through a valve assembly representing a different embodiment of the present invention.
Figure 4:
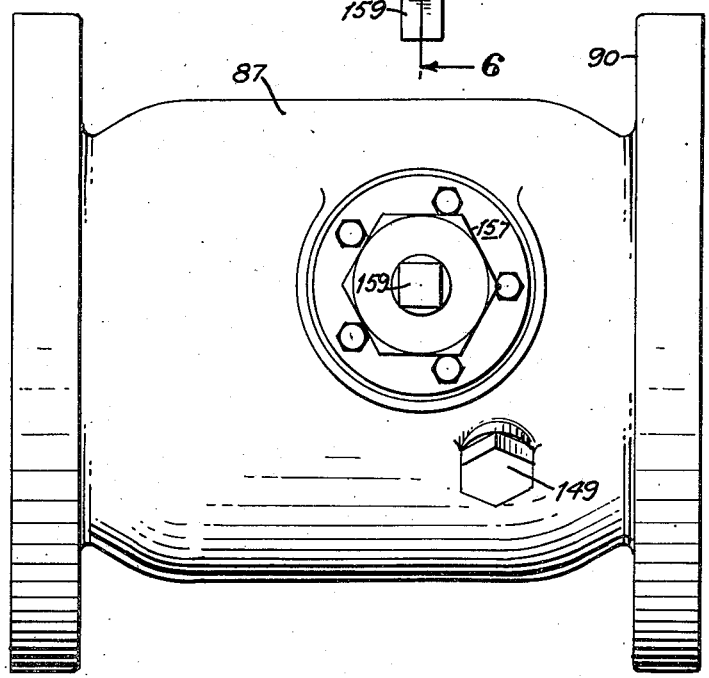
Figure 4 is a view in elevation of the valve assembly of Figure 3.
Figure 5:
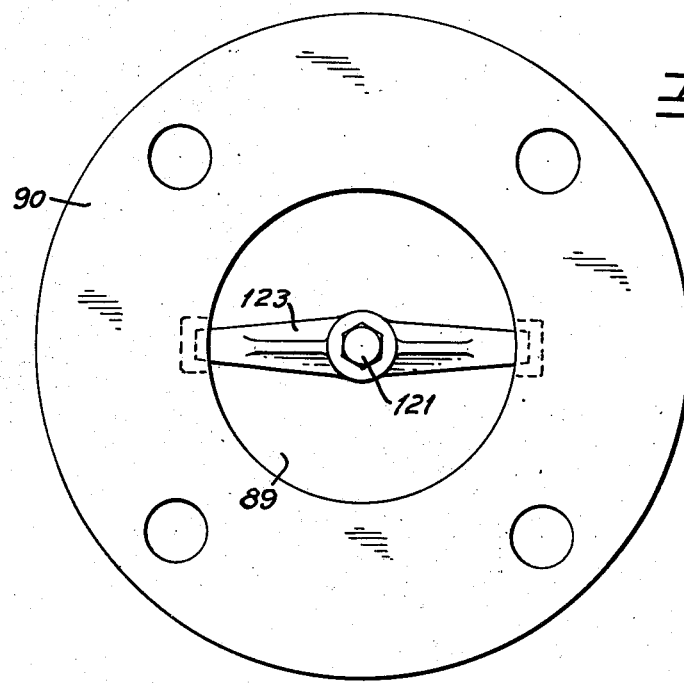
Figure 5 is an end elevational view of the valve assembly of Figure 3.
Figure 6:
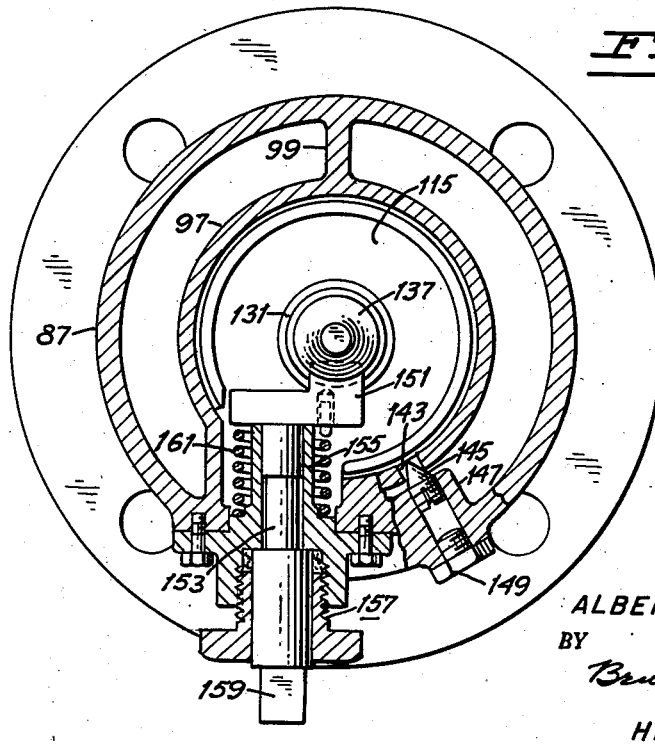
Figure 6 is a view in section through the valve assembly of Figure 3 taken in the plane 6—6 of Figure 3.

Referring to the drawings for details of my invention, the embodiment illustrated in Figure 1 comprises a valve housing 1 formed of two housing sections 3 and 5, each being flanged to permit joining of the two sections following the assembling of the valve components therein. The valve housing is provided with an intake opening 7 in the side wall of the lower section and a discharge opening 9 in the upper section, and provides a valve seat 11 intermediate the two openings.

Within the valve housing is a main valve 13 adapted to seat against the aforementioned valve seat. The main valve includes a sealing disc 15 preferably of artificial rubber such as Koroseal or the like, which is affixed to the face of piston having an axially depending substantially cylindrical body 17 formed with an axial bypass passage therethrough, which is somewhat constricted at an intermediate point therein by a constricting flange 19. This flange divides the passage into an upper portion 21 and lower portion 23, the upper portion being threaded to receive a flanged locking nut 25 for holding the sealing element to its support.

This nut is provided with a plurality of through passages 27 so as not to obstruct the bypass passage through the main valve.

The lower portion of the through passage in the valve body provides a compartment for the installation of a pivot valve 29 with the constricting flange forming a shoulder to provide a valve seat for the pilot valve.

This pilot valve includes a valve body 31 having a flange 33 in sliding contact with the inner surface of the lower compartment of the main valve body, such flange being recessed to carry a sealing disc 35 of suitable material such as artificial rubber or the like. This pilot valve is mounted on the lower end of a valve stem 37 which extends upwardly through a packing gland 39 and a boss 40 on the wall of the valve housing.

The main valve is normally urged to seating position by a coil spring 41 in the lower section of the valve housing surrounding the main valve body. The piston-forming part of the main valve includes an apron 43 slidably fitting within the lower section of the valve housing and carrying a sealing ring 45 adjacent the lower edge thereof. In the seating position of the main valve, this apron extends across the inlet opening 7 and seals it off. Upon unseating of the main valve, the accompanying downward movement of the apron associated therewith exposes a portion of the inlet opening in accordance with the extent of opening of the main valve, whereby the input to the valve through this opening may be varied.

The pilot valve on the other hand, is normally urged towards its seat by a coil spring 47 about the valve body and under compression between the valve body flange and a disc 49 supported on an inset washer adjacent the lower edge of the main valve body. Essential toward the proper design and operation of the entire valve assembly is the fact that the pilot valve spring shall be stiffer than the main valve spring. Access to the pilot valve compartment on the intake side of the valve is by way of a plurality of passages 53 through the walls of the main valve body terminating inwardly thereof adjacent the valve seat of the pilot valve.

Inasmuch as the inlet opening to the valve housing is normally closed by the apron associated with the main valve, the lower section of the valve housing forms a substantially closed chamber except for a leak passage 55 provided in the wall thereof, preferably at the lower end of this section.

Actuation of the main valve is through transmission of pressure thereto by way of the valve stem and pilot valve. To facilitate the application of such pressure to the valve stem by an operator, I provide a bell crank lever type handle 57, one arm of which rests against the upper end of the valve stem while the other is shaped to provide a hand grip 58, and this bell crank lever type handle is pivoted to the upper end of a bracket 59 which is suitably affixed to the valve casing or housing.

The entire valve assembly is designed for mounting on the discharge of a meter casing 61 with the lower section of the valve housing extending into the casing, exposing both the inlet opening and the leak passage to the liquid discharged from the meter. In the absence of pressure upon the valve stem, the chamber, determined by the lower section of the valve housing, will fill up with liquid via the leak passage and pressure will build up therein in accordance with the functioning of the system pump. Such liquid pressure acting against the entire under surface of the main valve body will aid the main valve spring in assuring a liquid tight seating of the main valve against its seat. Under these conditions were the valve stem directly connected to the main valve, considerable pressure against the valve stem would be required in order to overcome this accumulation of pressure to unseat the main valve and expose the inlet opening to the flow of liquid through the valve housing.

With the pilot valve included in the assembly as illustrated and described above, the area thereof exposed to the hydraulic pressure of the liquid in the chamber is relatively small compared to the overall exposed area of the main valve body, and accordingly, considerably less pressure will be required to open the pilot valve. This will be further minimized somewhat by the fact that the hydraulic pressure transmitted through the inlet passages to the pilot valve compartment will tend to partially neutralize the hydraulic pressure against the lower end of the pilot valve assembly. Once the pilot valve is unseated, the permitted flow of liquid through the bypass passage to the discharge side of the main valve, will tend to equalize pressures between the intake side and the discharge side of the main valve, thereby freeing it from the hydraulic pressure which previously existed against the under side of the main valve body, thus enabling the main valve to be unseated with ease. From that point on, opening movement of the main valve will require but a minimum of effort throughout the full extent of its permissible stroke.

Normally, at the start of a delivery operation, the valve will be open to its fullest extent. Under such conditions, however, the rotation of the counter wheels will be so fast, particularly the units wheel, as to practically defy a reading thereof in time to close off the valve when the meter reaches the reading indicative of the amount of liquid to be delivered. Therefore, as the amount to be delivered approaches its final value, it becomes advantageous to be able to slow down the liquid flow as desired without having to hold the valve open at an intermediate position, against heavy hydraulic pressures.

The design and construction of the present valve assembly provides this advantage because it imparts to the valve the ability to balance the pressures on both sides of the main valve while the liquid is flowing through the valve housing. This may very readily be appreciated by analyzing the operation of the valve assembly when the operator returns the main valve from its full open position to an intermediate position, which of course is accomplished merely by partially retracting the handle to an intermediate position. When held at such intermediate position, the pilot valve will remain stationary at the position determined by such holding of the handle. Therefore, any tendency on the part of the main valve to further return toward its seating position must necessarily result in such valve lifting away from the pilot valve, and as soon as this begins, such hydraulic pressure as tended to move the main valve toward its seat is reduced or equalized, and such tendency on the part of the main valve to move is thereby discouraged.

In this connection, it might be pointed out that the main valve spring cannot by itself force the main valve to its seating position under the circumstances because, as was previously pointed out, the pilot valve spring is designed to a greater stiffness than that of the main valve spring, and therefore would overcome such tendency on the part of the main valve spring to move the main valve toward its seating position.

Should the operator, with the valve in its full open position, suddenly swing the handle to its valve closing position, a sudden slamming shut of the valve becomes impossible because the operator has no control on the rate of closing of the valve under these conditions. Closing of the valve is determined solely by the rating of the main valve spring and the rate at which liquid percolates or flows through the leak passage. It will be appreciated that in closing, the valve stem and pilot valve will move along with the main valve as a unit.

Should the leak passage be closed, no return of the valve to its seating position would be possible, inasmuch as any tendency of the valve to move toward its seat would create a vacuum in the lower section of the valve housing and thereby preclude movement of the valve. By this it becomes clear that the rate at which the main valve may move toward its seating position will depend on the rate at which such vacuum condition may be relieved by the admission of liquid through the leak passage, and this of course will be a function of the size of the leak passage.

For this reason therefore, I prefer to make such leak passage adjustable, and this can be accomplished by affixing to the under side of the chamber, a bracket 65 with an opening 67 therein registering sufficiently with the leak passage 55 in the chamber wall to provide the maximum leak passage which one may possibly require, and thereafter adjusting the effective size of this passage.

This may be done in a very simple manner by mounting a machine screw 69 in the bracket and threadedly mounting thereon a slider 71 having a perforation 73 therein, and by shifting this slider, through rotation of the machine screw, the leak passage may be altered to a more or less degree, as desired. A compression spring 75 about the machine screw between the bracket and the slider, will serve to hold the machine screw and its slider in their proper relationship to the other components and facilitate adjustment of the slider.

In different installations, it is not always possible to maintain the same orientation between the control handle and the valve assembly, for the disposition of the valve assembly will depend largely on the environment in which the installation is made, while the orientation of the handle is determined with due consideration for the operator.

In order to render the valve assembly sufficiently flexible to fit any situation of this kind, the handle bracket 59 at its lower end terminates in a ring 77 surrounding the boss 49 and held thereon by a nut 79 threaded on the boss.

A pin 81 extending downwardly from the ring is adapted to mesh with any one of a plurality of depressions 83 in the valve housing around the boss to fix the directional position of the handle for a particular installation.

The embodiment of my invention, as illustrated in Figure 3 through 6, inclusive, includes a main valve housing 87 of substantially cylindrical form having its input opening 89 at one end and its discharge opening 91 at the opposite end. The housing has a flange 99 at its inlet end for mounting the valve assembly on a meter casing. Bordering the discharge opening about its inner edge, is the valve seat 93 for the main valve 95.

Intermediate the inlet end and the discharge end, is a cylindrical wall 97 supported concentrically with the main valve housing by radial ribs 99 joining this cylindrical wall to the main valve housing. The space between this cylindrical wall and the main valve housing defines the main flow path for liquid passing through the valve.

The main valve comprises a valve head having a central recess 103, bordered by a rimmed flange 105 to receive the valve sealing element 107 in the form of a ring of resilient material such as artificial rubber or the like, such sealing element being held in position against such flange by a nut 109 threaded into the recessed valve head, such nut having an axial passage 111 therethrough.

This main valve is formed with an integral rearwardly extending valve stem 113 supporting at an intermediate point thereof, a piston 115 including an apron 117, the piston being of a diameter sufficient to provide a sliding fit along the interior surface of the cylindrical wall. This piston serves as a closure for that end of the cylindrical wall facing the main valve. At its other end, the cylindrical wall is closed by a cap 119 held in position under pressure of an adjusting screw 121 mounted in a brace bar 123 extending across the inlet opening of the main valve housing. The piston and cap together with the cylindrical wall, form a closed chamber 125 which corresponds to the chamber defined by the housing section 3 of Figure 1.

The main valve stem has an axial passage 127 therethrough, providing for communication between the discharge side of the main valve and the aforementioned chamber. At its inner end, this main valve stem carries a ring 129 of resilient sealing material such as artificial rubber or the like, which is clamped to the end of the valve stem by a bezel 131. Such ring of sealing material constitutes a valve seat for a pilot valve 133 whose function corresponds to the pilot valve of the embodiment of my invention as depicted in Figure 1.

The pilot valve in the present instance is of disk shape having a rearwardly extending stem 135 which terminates in a head 137.

Through the hollow stem of the main valve is a guide stem 139 for the pilot valve, which guide stem is fluted and extends into the recess 103. At its free end, the guide stem carries in spaced relation to the end of the stem passage, a washer 141 of a diameter sufficient to abut the bottom of the recess after the pilot valve has been opened. In the interim, the fluted guide stem will permit equalization of pressure between the chamber and the discharge side of the main valve, following which, opening of the main valve becomes a simple matter as the washer engages the valve head in response to continued retraction of the pilot valve.

As in the embodiment of Figure 1, a leak passage 143 is provided from the inlet side of the main valve to the chamber 125 preferably through the cylindrical wall 97, whereby the pressure within the chamber during closed conditions of the main valve, will build up to the existing pressure of the liquid on the inlet side of the main valve.

Such leak passage is made adjustable by means of a tapered set screw 145 adjustably threaded into a radial passage provided in the main valve housing which at this point has been formed with an inside boss 147. A cap screw 149 closing the entrance to such threaded passage will serve to preclude unauthorized tampering with the adjustment of the leak passage adjustment screw. This arrangement permits of making adjustments without removal of the valve assembly from the meter casing or otherwise disturbing the system.

The pilot valve is operable through a crank arm 151 mounted on the inner end of a control stem 153 extending through a bushing 155 mounted in the wall of the main valve housing.

A packing gland and gland nut assembly 157 surrounding the stem, serves to preclude a leak at this point and more effectively stabilize the stem in its bushing. At its external end, the stem preferably terminates in a square end 159 for application of a suitable control handle (not shown).

A coil spring 161 surrounding the stem and bushing, has one end anchored in the crank arm while its other end is anchored to the bushing. This spring will then function to restore the pilot valve to closing position upon release of the handle, following the opening of the pilot valve. Preferably the restoring spring is assembled in partially wound condition so as to maintain a positive closing force against the pilot valve in the absence of any turning movement applied to the handle.

It will be appreciated that the valve assembly just described, while differing structurally from that of Figure 1, will function in similar manner and have similar operating characteristics. By making the exposed surface of the piston of greater area than the rear surface of the main valve, a balance of pressure will exist in favor of the opening of the main valve which will serve to facilitate the initial opening of such valve upon equalization of pressures between the pilot valve chamber and the discharge side of the main valve.

While I have disclosed my invention in considerable detail, it is apparent that the same is subject to alteration and modification without departing from the underlying principles involved, and I accordingly do not desire to be limited in my protection to such details except as may be necessitated by the appended claims.

I claim:

1. A valve assembly comprising a valve housing having an intake opening and a discharge opening and a main valve seat intermediate said openings; a main valve adapted to fit said seat and having associated therewith an apron forming a chamber in said housing on the intake or pressure side of said main valve; means normally urging said main valve to its seating position, said means including a compression spring in said chamber and bearing against said main valve; means providing a leak passage into said chamber in communication with said intake opening; and a pilot valve axially associated with said main valve, said pilot valve having a stem extending externally of said housing through a boss thereon, a bracket terminating in a ring surrounding said boss, a bell crank lever type handle pivotally mounted on said bracket with one arm resting on said stem, and means for fixedly orienting said bracket and handle in any desired directional position about said boss.

2. A valve assembly comprising a valve housing having an intake opening and a discharge opening and a main valve seat intermediate said openings; a main valve adapted to fit said seat and including an apron normally sealing said intake opening when said main valve is in fitting contact with said main valve seat, forming a chamber in said housing on the pressure side of said main valve; means normally urging said main valve to its seating position, said means including a compression spring in said chamber in pressure-exerting relationship against said main valve; means forming a leak passage into said chamber in communication with said intake opening; a pilot valve axially associated with said main valve; and means for adjustably altering said leak passage.

3. A valve assembly comprising a valve housing having an intake opening and a discharge opening and a main valve seat intermediate said openings; a main valve adapted to fit said seat and including an apron normally sealing said intake opening when said main valve is in fitting contact with said main valve seat, forming a chamber in said housing on the pressure side of said main valve; means normally urging said main valve to its seating position, said means including a compression spring in said chamber in pressure-exerting relationship against said main valve; means involving an opening through the wall of said chamber for forming a leak passage into said chamber in communication with said intake opening; a pilot valve axially associated with said main valve; and means for adjustably altering said leak passage, said means including a shiftable obstruction over said opening.

4. A valve assembly comprising a valve housing having an intake opening and a discharge opening and a main valve seat intermediate said openings; a main valve adapted to fit said seat and including an apron normally sealing said intake opening when said main valve is in fitting contact with said main valve seat, forming a chamber in said housing on the intake or pressure side of said main valve; means normally urging said main valve to its seating position, said means including a compression spring in said chamber in pressure-exerting relationship against said main valve; means involving an opening through a wall of said chamber for forming a leak passage into said chamber in outside communication with said intake opening; a pilot valve axially associated with said main valve; and means for adjustably altering said leak passage, said means including a bracket over said opening and having an opening registering therewith, a screw supported in said bracket, and a slider threaded onto said screw and adapted to slide across said passage with rotation of said screw.

ALBERT J. GRANBERG.

REFERENCES CITED

The following references are of record in the file of this patent:

UNITED STATES PATENTS

| Number | Name | Date |
|---|---|---|
| 1,164,990 | Cockburn | Dec. 21, 1915 |
| 1,883,895 | Funston | Oct. 25, 1932 |
| 2,426,065 | Stevens | Aug. 19, 1947 |